United States Patent [19]

Bononi

[11] Patent Number: 4,818,092

[45] Date of Patent: Apr. 4, 1989

[54] DEVICE ON A PAIR OF GLASSES

[76] Inventor: Walter H. Bononi, Zeppelinstrasse 9, 7012 Fellbach-Schmiden, Fed. Rep. of Germany

[21] Appl. No.: 616,314

[22] Filed: Jun. 1, 1984

[30] Foreign Application Priority Data

Jun. 1, 1983 [DE] Fed. Rep. of Germany ... 8316015[U]

[51] Int. Cl.$^4$ ............................................... G02C 5/12
[52] U.S. Cl. ..................................... 351/136; 351/138; 351/139
[58] Field of Search .................. 351/136, 137, 138, 88

[56] References Cited

U.S. PATENT DOCUMENTS 3,345,121 10/1967 DeAngelis ...................... 351/137 X
4,345,824 8/1982 Daubignard ..................... 351/138 X Primary Examiner—Rodney B. Bovernick

[57] ABSTRACT

A frame of a pair of glasses has a pair of eye rims with front surface and nasal regions which are connected together by a bridge with a front surface and a nasal region. The frame has a shallow rabbet which extends from the nasal region of one eye rim, through the nasal region of the bridge, into the nasal region of the other eye rim, and has a predetermined depth. The shallow rabbet has a forward rabbet wall spaced from the front surface of the eye rims and the bridge, and a saggital rabbet wall, which is substantially longer than the forward rabbet wall. The saddle strap pad, made of plastic, is glued at its forward edge region into the shallow rabbet, and in the area of the forward end region is thicker than the depth of the rabbet. The saddle strap pad has a Shore D hardness in the range 10–30, preferably about 20.

5 Claims, 1 Drawing Sheet

DEVICE ON A PAIR OF GLASSES

The invention relates to a frame of a pair of glasses having a pair of eye rims with front surfaces and nasal regions which are connected together by a bridge with a front surface and a nasal region; and a saddle strap pad made of plastic, having a forward end region.

BACKGROUND OF THE INVENTION

Arrangements of this kind have obviously been the subject of prior use in West Germany. These have a Shore D hardness of about 30 for silicone elastomers according to American Society of Testing Materials Standard D2240-85 (United States), and DIN 53.505 (West Germany). The saddle strap pad is held in its lobe region by metal pad arms, which start from the nasal region of the eye rim. Thus the saddle strap pad touches neither the bridge nor the eye rim and hence has a spacing from it of several millimeters. The advantage of the saddle strap pad is the better support of the weight.

What is disadvantageous in this construction is the following:

(a) Pad arms are necessary.

(b) The pad arms must have at their ends a construction which can absorb over a large area the forces from the lobes of the saddle strap pad, yet does not spoil the softness of the saddle strap pad.

(c) A tension is certainly exerted on the limbs of the saddle strap pad. This tension causes those regions which hitherto engaged tightly around the stem of the anchorage to enlarge ovally in the direction of tension. From this pockets result, in which perspiration, dirt and skin rubbings can collect. This is unesthetic, for one thing, and can ruin the effect which can in itself be obtained by the soft pads, i.e. the skin can be severely irritated by such accumulations.

(d) Choices of very low hardness, e.g. around 20 or lower, can no longer be used, because otherwise the anchorage would at once be pulled out from the lobes and right at the start when trying on the glasses the above-mentioned oval elongations would result, so that no person would buy such a pair of glasses. Moreover, not only would the anchorages become very useless, but the tensile loading in the upper apex region of the saddle strap pad, which is there substantially thinner, would be so high that the material would tear. On this ground also only the higher Shore hardnesses can be chosen.

(e) With various materials high Shore hardnesses have the consequence that the hardness of the material becomes dependent on temperature. If the surroundings are very hot, then the Shore D hardness tends to become softer. If it is very cold, then the Shore D hardness tends to become harder. But one wants to have Shore D hardnesses which are as uniform as possible.

(f) Since the saddle strap pad has a spacing from the eye rims and from the bridge, this construction is only suitable for those glasses in which the bridge can sit relatively high. Bridges arranged lower are not possible with such a construction.

(g) Also, in the very region which is most definitive of personality, the appearance leaves something to be desired, because an observer sees there as it were a freely floating construction, in which a milky strip, i.e. the saddle strap pad, lies above the nose of the wearer of the glasses.

(h) If the inherently soft material is subjected to a mechanical stress, then the Shore D hardness still present is shifted upwards, so that one cannot make use at all of the Shore D hardness that is inherently present.

OBJECTIVE AND STATEMENT OF THE INVENTION

The object of the invention is to provide a device which avoids all of the above disadvantages, and, with retention of the saddle-strap supporting principle, makes possible the use of all possible desirable Shore D hardnesses in the range lying below 30. Furthermore, the construction is to be economical of material and usable without it being necessary to alter the construction of glasses up to now.

According to the invention, this object is achieved by:

(a) A shallow rabbet i.e. L-shaped groove which extends from the nasal region of one eye rim, through the nasal region of the bridge, into the nasal region of the other eye rim, and has a predetermined depth, a forward rabbet wall spaced from the front surface of the eye rims and the bridge, and a sagittal rabbet wall, which is substantialy longer than the forward rabbet wall thus forming an L-shaped rabbet, which is an L-shaped groove in the rim and nasal regions;

(b) The saddle strap pad at the forward edge region is glued into the shallow rabbet, and in the area of the forward end region is thicker than the depth of the rabbet; and (c) The saddle strap pad has a Shore D hardness in the range 10-30.

Advantageously, the invention includes the following additional features:

Both rabbet walls are level. With this feature, very little is seen of the walls of the rabbet, even with transparent or translucent glasses made of plastic. Moreover, the walls of the rabbet can be produced by simple milling operations, or alternatively the production of the molding is simpler. Also, the molding for the saddle strap pads becomes simpler and inaccuracies in complementary shapes, which would arise if the rabbet walls were to follow a wavy shape for example, are avoided.

The two rabbet walls are perpendicular to one another. By this feature, also such advantages are obtained.

The saddle strap pad in the region behind the forward end region is thicker than in forward end region. By this feature, material is saved, which is very significant with expensive silicone material, the eye rim practically does not need to be weakened by the rabbet and esthetic advantages are also obtained.

The Shore D hardness of the plastic material is approximately 15-25, perferably approximately 20. Due to these features, the advantages of the invention can safely be employed for very soft materials.

DESCRIPTION OF THE DRAWING

The invention is described below with reference to a preferred exemplary embodiment. In the drawing.

DETAILED DESCRIPTION

Figure 1:
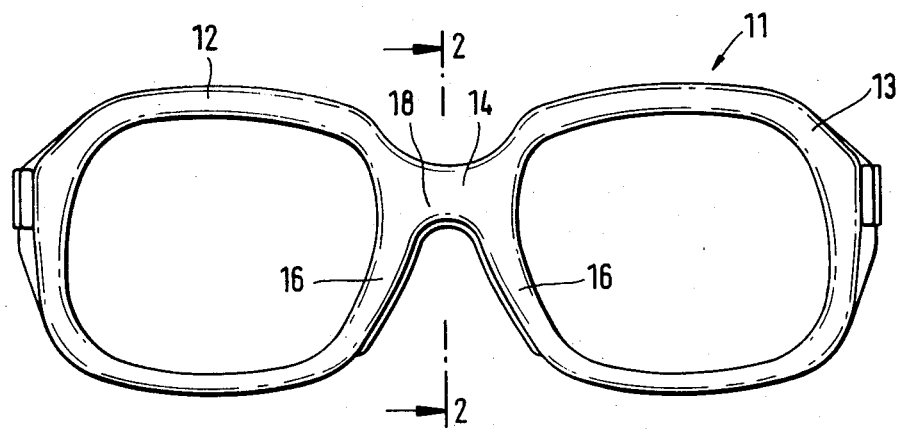
FIG. 1 shows the front elevation of the frame with the pad on a scale of 1 : 1.
Figure 2:
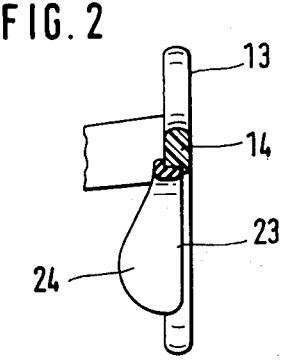
FIG. 2 shows a section along the line 2—2 in FIG. 1.

A pair of glasses has a frame 11 of acetate plastic, which is translucent. The two eye rims 12, 13 are connected together by a bridge 14. In the nasal region 16 of the eye rims 12, 13 there is provided a shallow rabbet 17, which also extends at the same depth completely through the nasal region 18 of the bridge 14. The forward rabbet wall 19 or the rabbet 17 has a distinct spacing from the forward surface 21 of the eye rims 12, 13 and of the bridge 14. The forward rabbet wall 19 follows a level course. Arranged perpendicularly to it and likewise level is the sagittal rabbet surface 22, which extends without any further offset backwards. As can be gathered from FIGS. 1 and 2, the shallow rabbet 17 starts relatively far down in the nasal regions 16.

Figure 3:
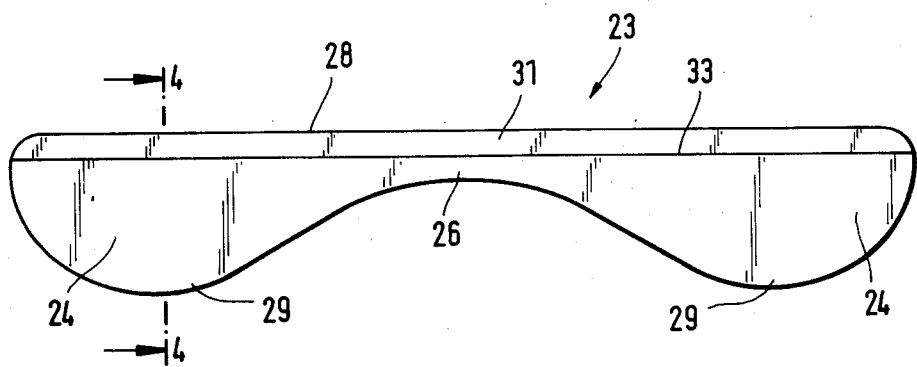
FIG. 3 shows the plan view of the pad lying flat.

A saddle strap pad 23 is made of elastromeric silicone with a Shore D hardness of 17. It is made of translucent, colorless material. It is symmetrical with respect to its central plane and has two lobe regions 24, which are connected together by a substantially narrower bridge region 26. The inner surface 27 intended for contact with the skin of the nose is flat throughout without any step. The region of its forward end (or forward peripheral surface) is straight. The rearward edge 29 of the lobes 24 tapers in accordance with FIG. 3, and so does the bridge region 26. Complementary to the shallow rabbet 17 there is provided adjoining the end 28 a step 31, which has a smaller cross section than the lobe regions 24 and the bridge region 26. The thickness of the step 31 is greater than the depth of the shallow rabbet 17, so that in the glued-in condition the inner surface 27 in the region of the step 31 projects higher than the nasal surface 32 of the eye rims 12, 13 and of the bridge 14. The gluing takes place along the forward end zone 28 on the forward rabbet wall 19, and along the sagittal rabbet surface 22 on the step 31.

Figure 4:
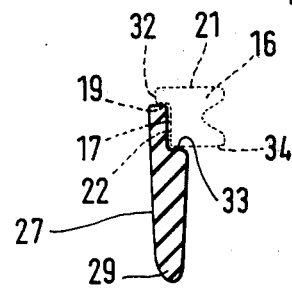
FIG. 4 shows a section along the line 4—4 in FIG. 3 with the eye rim cross section indicated in broken lines.

As is apparent especially from FIG. 4, following the step 31 there is a surface 33 directly outwards, by means of which the lobe region 24 rest upon the rearward surface 34 of the nasal regions 16 without gluing. The same is also true for the nasal region 18.

I claim:

1. In combination, a frame of a pair of glasses having a pair of eye rims with front surfaces and nasal regions which are connected together by a bridge with a front surface and a nasal region; and a saddle strap pad made of plastic, having a forward end region, comprising the improvement wherein:
    (a) A shallow rabbet extends from the nasal region of one eye rim, through the nasal region of the bridge, into the nasal region of the other eye rim, and has a predetermined depth, a forward rabbet wall spaced from the front surface of the eye rim and the bridge, and a sagittal rabbet wall, which is substantially longer than the forward rabbet wall;
    (b) The saddle strap pad at the forward end region is glued into the shallow rabbet, and in the area of the forward end region is thicker than the dept of the rabbet;
    (c) The saddle strap pad has a Shore D hardness for silicone elastomer in the range 10–30; and
    (d) Both the forward rabbet wall and the sagittal rabbet wall are level.

2. Combination as claimed in claim 1, wherein the two rabbet walls are perpendicular to one another.

3. Combination as claimed in claim 1, wherein the saddle strap pad in the region behind the forward end region is thicker than in forward end region.

4. Combination as claimed in claim 1, wherein the Shore D hardness of the plastic material is approximately 15–25.

5. Combination as claimed in claim 1, wherein the Shore D hardness of the plastic material is approximately 20.

* * * * *